United States Patent

[11] 3,587,386

| [72] | Inventor | Walter J. Weidner |
| | | 350 Sun Valley Drive, Leacock, |
| | | Pa. 17540 |
| [21] | Appl. No. | 758,899 |
| [22] | Filed | Sept. 10, 1968 |
| [45] | Patented | June 28, 1971 |

[54] METHOD AND APPARATUS FOR RESURFACING STEEL MOLDS
3 Claims, 3 Drawing Figs.

[52] U.S. Cl. .................................................. 90/12,
51/180, 90/15
[51] Int. Cl. ................................................. B23c 3/00,
B23c 1/20, B24b 23/02
[50] Field of Search ........................................ 90/15, 11.3,
11, 164, 171, 12; 51/180; 77/.1; 29/(Inquired);
164/(Inquired); 18/(Inquired)

[56] References Cited
UNITED STATES PATENTS

| 2,566,697 | 9/1951 | Davies | 90/15X |
| 3,138,998 | 6/1964 | Ivan | 90/15X |
| 3,456,557 | 7/1969 | Hautau | 90/15 |
| FOREIGN PATENTS | | | |
| 243,883 | 2/1947 | Switzerland | 90/15 |
| 902,505 | 8/1962 | Great Britain | 90/15 |

Primary Examiner—Gil Weidenfeld
Attorney—George L. Herr

ABSTRACT: A method and apparatus of resurfacing the mold liners used in the production of slabs of steel. These mold liners are made of graphite in most instances and by the present method and apparatus it is possible to perform the resurfacing operation without removal of the mold liners from the mold. This is accomplished by opening the mold far enough to place a device within the space between the mold liners and traversing the length and height of the mold liners by a resurfacer which removes the irregular surface and restores the smooth surface required for the production of slabs of steel.

METHOD AND APPARATUS FOR RESURFACING STEEL MOLDS

PRIOR ART

In the production of steel, the molten steel is charged into a mold and allowed to cool. The high temperature of the molten steel oxidizes the surface of the material used to line the mold. As a result of this oxidizing action, after a number of heats or mold charges it is necessary to resurface the molds by removing the oxidized material. One of the most common lining materials used to line the molds for the production of steel is graphite.

The molds in question are of a size suitable to produce relatively large slabs of steel, and are so designed as to completely surround the mold cavity with graphite slabs carried by suitable frames or mold members. Because of the large size of the molds, the lining material is not made in one piece but is made in individual sections clamped in a mold frame so that a series of such sections comprise the interior lining for the mold.

In the past when it became necessary to resurface the molds to remove the oxide from the surface of the graphite blocks, the molds were shut down and the entire side frames containing the graphite blocks were removed and shipped to a machine shop where they could be placed in a suitable device and resurfaced. It is necessary to perform the resurfacing operation in this manner to insure that the individual blocks or slabs of graphite are properly aligned so that no line of demarcation is noticeable where the slabs abut one another. Such line of demarcation would cause a line on the steel slab. This disassembly and shipping is a time consuming operation and the molds are out of productive use while they are being resurfaced and realigned in accordance with the procedure outlined above.

THE INVENTION

By the present invention, the mold lining slabs are resurfaced in their operative position in the mold by merely opening the mold a sufficient distance to accommodate a resurfacing device between the mold sections and by having the resurfacing device transverse the distance from one end of the mold to the other, and from top to bottom of the graphite slabs, requiring a minimum amount of down time of the production operation.

In practicing the method of the invention, the mold frames are separated, opening the mold cavity to a size suitable to receive a resurfacing device comprising a beam extending the length and height of the mold frames. The mold frames holding the graphite retain their parallel relationship with one another and the beam is placed between the mold frames in parallel relationship therewith. A carriage mounted on the beam is moved along the beam and carries a resurfacing member which may be a cutting tool, a grinder or a sander depending on the nature of the operation to be performed. The distance between the mold frames in their open position is such that the resurfacing elements engage both mold frames simultaneously so that on each path along the beam the graphite slabs in both frames of the molds are operated on. After the carriage travels the entire length of the beam the resurfacing elements are either raised or lowered so as to engage a different area of the graphite slabs on the return pass. This operation is continued until the entire area of both mold frames is resurfaced.

THE DRAWING

In order that this invention may be more readily understood, it will be described in connection with the attached drawing in which:

FIGS. 1 and 2 combined, show side elevation of the machine of this invention, and FIG. 3 shows an end view with the device in operative position between the graphite slabs secured in a mold frame.

Figure 1:
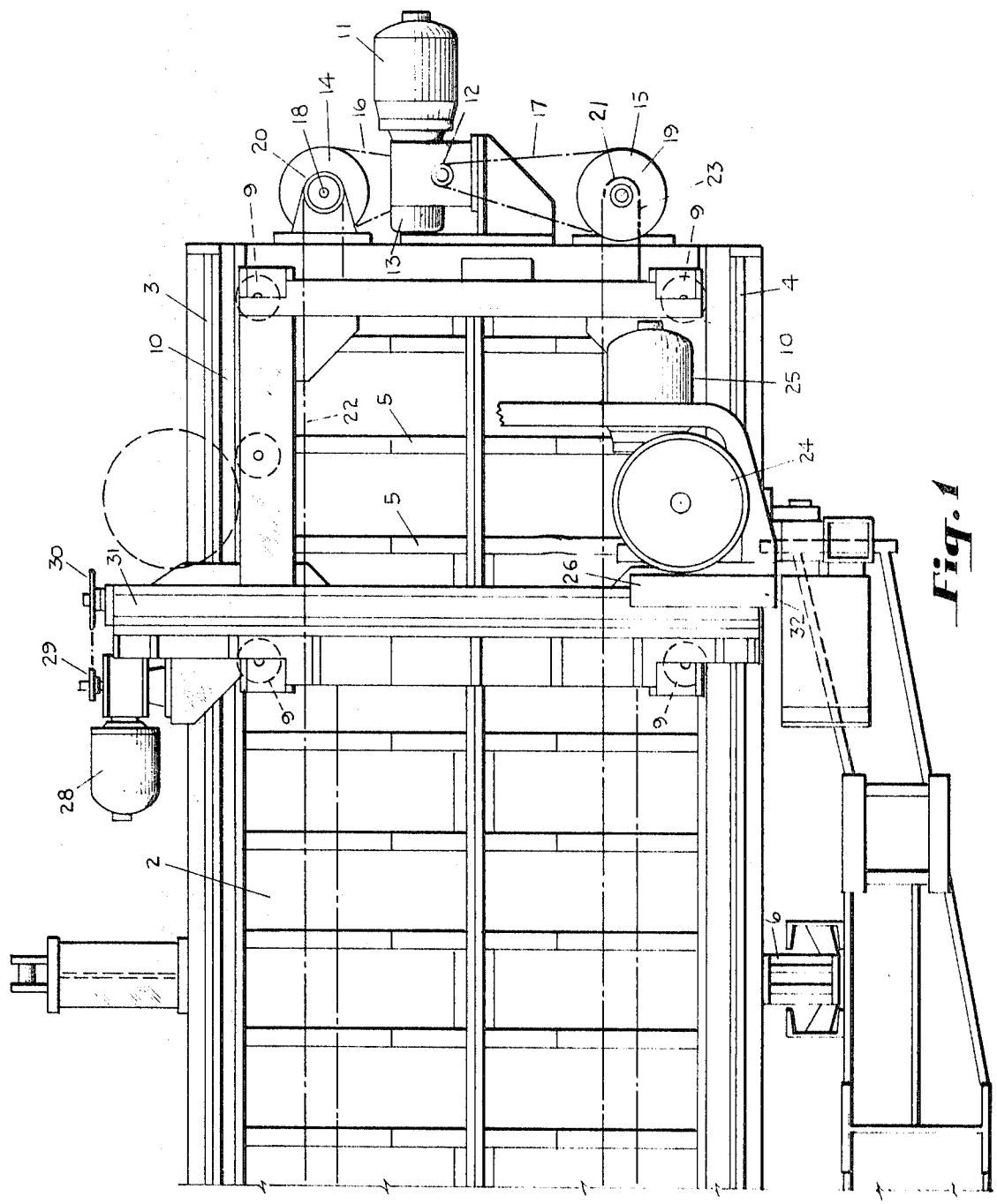
Referring to FIG. 1 there is shown a main beam 2 which is of a length sufficient to extend the entire length of the mold cavity when the mold is open. This beam 2 is in the general form of an I-beam having a top flange 3 and a bottom flange 4. Suitable reinforcing members 5 are provided to give the added strength and resistance to twisting etc. which is required of devices utilized for this purpose. The beam is preferably made in sections so that in case of damage individual sections can be replaced without requiring replacement of the entire beam.
Figure 2:
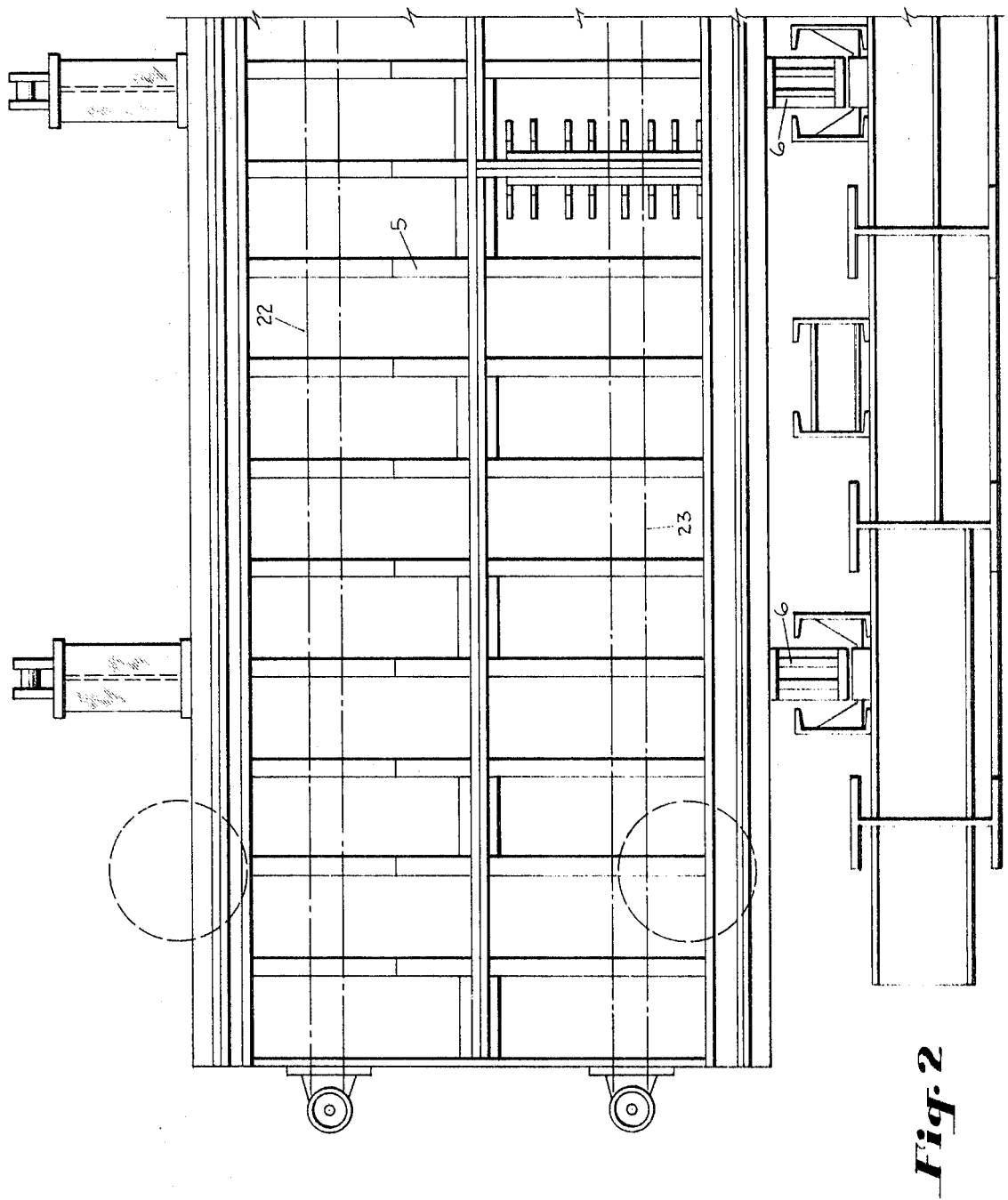
Figure 3:
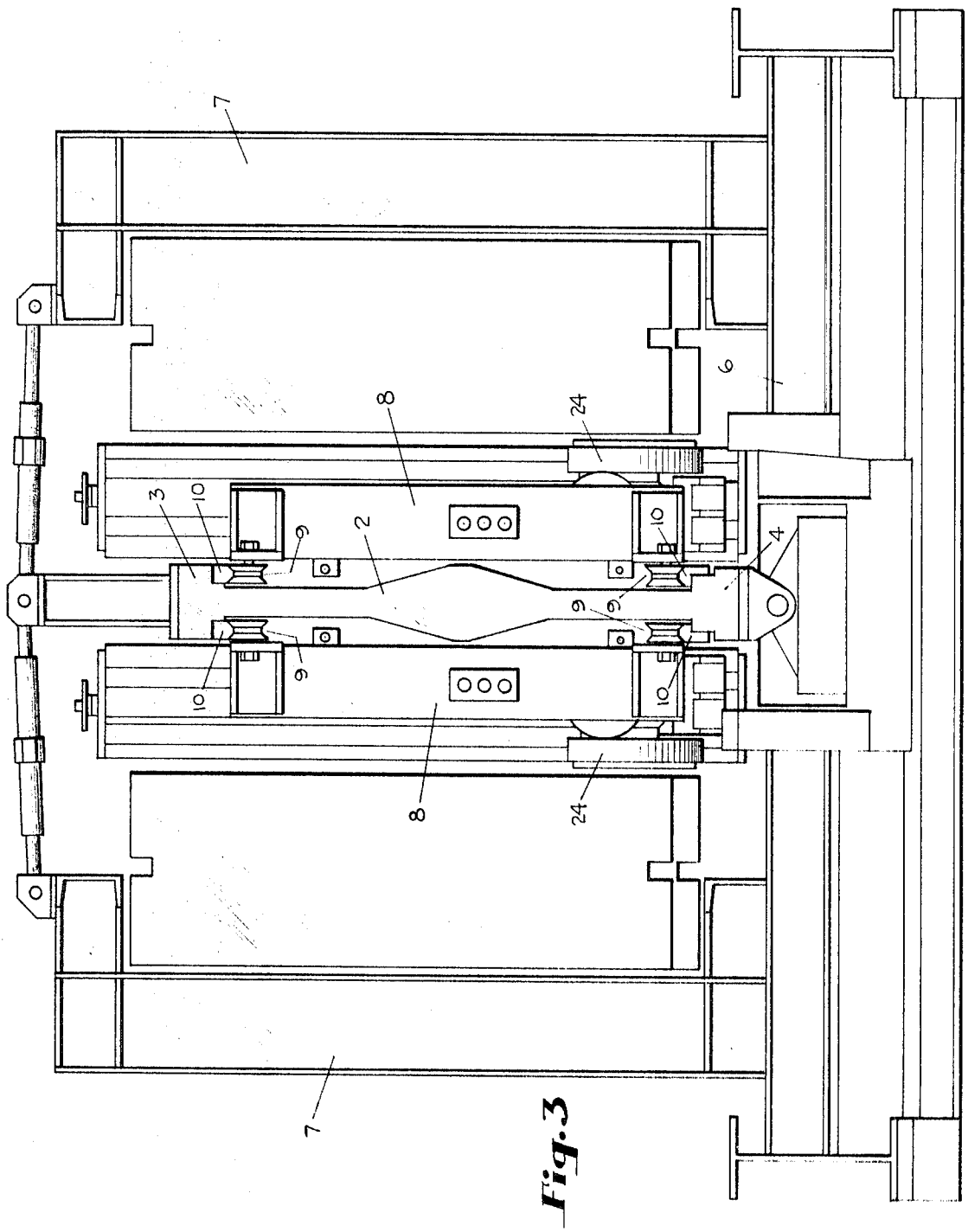

When placed in position for operation the beam 2 rests on the cross beams 6 which are a part of the structure of the main mold 7 to be described later.

Mounted on the beam 2 and moveable therealong is a carriage 8. Movement of the carriage along the beam 2 is made possible by means of rollers 9 which roll along ways 10 at the top and bottom of the beam 2.

The propelling force to move the carriage along the length of the beam 2 is provided by the motor 11 mounted on the extreme right end of the beam 2 as viewed in the drawing. The motor 11 drives the sprocket 12 through a variable speed drive 13 which in turn drives sprockets 14 and 15 through chains 16 and 17 respectively. Sprocket 14 is mounted on shaft 18 and sprocket 15 is mounted on shaft 19. Also mounted on shafts 18 and 19 respectively are sprockets 20 and 21 which drive chains 22 and 23 respectively, both of which are connected to the carriage 8. One end of the chains 22 and 23 is attached to the right-hand end of the carriage 8 as viewed in FIG. 1 and the other end of the chains is attached to the left-hand side of the carriage 8. With this arrangement, rotation of the shafts 18 and 19 in a clockwise direction will move carriages 8 from right to left in FIG. 1 and counterclockwise rotation of the shafts 18 and 19 will move the carriage from left to right; such movement being by means of rollers 9 rolling on the ways 10.

Mounted on the carriage 8 for vertical movement thereon is a resurfacing element 24 which may be a milling cutter, grinder or sander. In the preferred embodiment the milling cutters are mounted on the face thereof for engagement with the material to be surfaced by the device. Rotary motion is imparted to the cutter 24 by a motor 25. In the embodiment here illustrated, two cutters are provided opposite one another to engage the material on each side of the device as the carriage moves along the beam. The cutter heads 24 are mounted for vertical movement on the carriage 8 by slides 26 which engage ways 27. A motor 28 mounted on top of the assembly through a suitable drive mechanism rotates sprockets 29 and 30. Sprocket 30 is keyed to a shaft 31 which is provided with a screw thread. The screw shaft 31 is in threaded engagement with the mount 32 for the cutters 24 so that rotation of the shaft in one direction raises the cutters and rotation of the shaft in the opposite direction lowers the cutters.

I claim:

1. In a device for resurfacing mold liners, comprising a beam extending the entire length of the device, said beam being located between and coextensive with the length and height of the mold linear, a carriage mounted on each side of said beam for movement along the beam throughout substantially the entire length of said beam, a resurfacing member mounted on the outer side of each of said carriages facing a mold liner, means to rotate said resurfacing members, and means to propel said carriages throughout substantially the entire length of said beam.

2. A device in accordance with claim 1 in which the resurfacing member is a rotary cutter.

3. A device in accordance with claim 1 in which the resurfacing member is movable in a direction perpendicular to the path of travel of the carriage.